United States Patent
Furuichi et al.

(10) Patent No.: US 7,341,357 B2
(45) Date of Patent: Mar. 11, 2008

(54) PROJECTION DISPLAY APPARATUS

(75) Inventors: Kunitaka Furuichi, Tokyo (JP); Masateru Matsubara, Tokyo (JP)

(73) Assignee: NEC Viewtechnology, Ltd., Minato-ku, Tokyo (JP)

( * ) Notice: Subject to any disclaimer, the term of this patent is extended or adjusted under 35 U.S.C. 154(b) by 0 days.

(21) Appl. No.: 11/594,076

(22) Filed: Nov. 8, 2006

(65) Prior Publication Data

US 2007/0206302 A1 Sep. 6, 2007

(30) Foreign Application Priority Data

Mar. 1, 2006 (JP) .............................. 2006-054839

(51) Int. Cl.
- G02B 7/182 (2006.01)
- G02B 5/08 (2006.01)
- G03B 21/28 (2006.01)

(52) U.S. Cl. .................. 359/862; 359/861; 353/99

(58) Field of Classification Search ............. 359/200, 359/201, 221, 196, 208, 212, 850, 852, 864, 359/855–857, 861, 862, 865; 362/296, 297, 362/341, 346; 353/98, 99, 37, 51, 78

See application file for complete search history.

(56) References Cited

U.S. PATENT DOCUMENTS

| | | | |
|---|---|---|---|
| 5,331,470 A * | 7/1994 | Cook | 359/859 |
| 6,513,935 B2 * | 2/2003 | Ogawa | 353/37 |
| 6,877,862 B2 * | 4/2005 | Fukunaga et al. | 353/70 |
| 6,886,953 B2 * | 5/2005 | Cook | 359/859 |
| 7,178,921 B2 * | 2/2007 | Konno et al. | 353/99 |

FOREIGN PATENT DOCUMENTS

| | | |
|---|---|---|
| JP | 07-059037 | 3/1995 |
| JP | 11-119185 | 4/1999 |
| JP | 11-183781 | 7/1999 |
| JP | 2000-206634 | 7/2000 |
| JP | 2004-144914 | 5/2004 |
| JP | 2005-284136 | 10/2005 |

\* cited by examiner

*Primary Examiner*—Alessandro Amari

(74) *Attorney, Agent, or Firm*—McGinn IP Law Group, PLLC

(57) ABSTRACT

A projection display apparatus includes an image forming element, and an imaging optical system made up of a plurality of reflectors for projecting an image formed by the image forming element to provide an enlarged version of the image, wherein at least one of the reflectors which make up the imaging optical system is movable for adjusting the focus, and the movable reflector is movable along a straight line non-parallel with the normal line of the image forming element.

12 Claims, 7 Drawing Sheets

PROJECTION DISPLAY APPARATUS

BACKGROUND OF THE INVENTION

1. Field of the Invention

The present invention relates to a projection display apparatus which projects an image formed by liquid crystal panels onto a screen to provide an enlarged version of the image. More particularly, the present invention relates to a projection display apparatus which comprises an imaging optical system made up of a plurality of reflectors.

2. Description of the Related Art

As one of projection display apparatuses for projecting an image formed by an image forming element to provide an enlarged version of the image, a projection display apparatus is known to comprise an imaging optical system (reflection imaging optical system) which is made up of a plurality of reflectors. FIG. 1 illustrates an example of a reflection imaging optical system. The illustrated reflection imaging optical system is made up of first reflector 51 to fourth reflector 54. Light emitted from a light source, not shown, is led to image forming element 55 through an illumination optical system, also not shown. Image forming element 55 modulates the light incident thereon based on an image signal to form an image (image light). The image light which is formed by image forming element 55 impinges on and reflected by a reflective surface of first reflector 51, and then impinges on a reflective surface of second reflector 52. Subsequently, the image light which is reflected by second reflector 52 is reflected by third reflector 53 and fourth reflector 54 in sequence, and is finally projected toward a screen, not shown.

As illustrated in FIG. 1, each reflector 51-54 is disposed at a position higher than the preceding reflector. Also, each reflector 51-54 is laid out to diagonally and upwardly direct image light toward the next reflector. This is intended to avoid interference of the image light with respective reflectors 51-54. In the reflection imaging optical system having the foregoing configuration, a predetermined reflector is reciprocally moved to adjust the spacings between this reflector and reflectors preceding and subsequent thereto, thereby adjusting the focus (see JP-A-2004-144914). In the illustrated reflection imaging optical system, third reflector 53 has a focus adjusting function. For adjusting the focus, third reflector 53 is moved along reference axis B parallel with the normal line A of image forming element 55 to adjust the spacing between third reflector 53 and fourth reflector 54. Since the focal length extends as third reflector 53 is moved closer to fourth reflector 54, a larger image can be projected by moving the projection display apparatus further away from the screen.

As described above, for projecting a larger focused image, the focal length must be extended by bringing a reflector having a focus adjusting function closer to the next reflector. However, the closer that a reflector, having the focus adjusting function, is brought to the next reflector, the greater is the downward movement of the light beam which is folded back by the next reflector. A more specific description will be given below with reference again to the exemplary reflection imaging optical system illustrated in FIG. 1. As third reflector 53 is brought closer to fourth reflector 54 to extend the focal length, a light beam which is folded back by fourth reflector 54 to stream downward. This results in a smaller clearance between the light beam folded back by fourth reflector 54 and third reflector 53. Eventually, the light beam folded back by fourth reflector 54 interferes with third reflector 53. Accordingly, the amount that third reflector 53 moves must be restricted so that the spacing between both reflectors 53, 54 will be wide enough to avoid the interference when third reflector 53 approaches closest to fourth reflector 54.

SUMMARY OF THE INVENTION

It is an object of the present invention to enable a reflector having a focus adjusting function to be brought as close as possible to a next reflector, thereby projecting a larger image onto a screen.

A projection display apparatus of the present invention includes an image forming element, and an imaging optical system made up of a plurality of reflectors for projecting an image formed by the image forming element to provide an enlarged version of the image. At least one of the reflectors which make up the imaging optical system is movable so that the focus can be adjusted. The movable reflector is movable along a straight line non-parallel with the normal line of the image forming element.

Preferably, the movable reflector has a reflective surface, whose radius of curvature is the largest of the radii of curvature of reflective surfaces of the reflectors which make up the imaging optical system.

The imaging optical system is preferably made up of a first reflector on which light emitted from the image forming element first impinges, a second reflector on which light reflected by the first reflector impinges, a third reflector on which light reflected by the second reflector impinges, and a fourth reflector on which light reflected by the third reflector impinges. In this configuration, the third reflector is preferably a reflector which is moved so that the focus can be adjusted.

Preferably, the first reflector has a spherical reflective surface, and each of the second reflector, third reflector, and fourth reflector has an aspherical or a free-form reflective surface.

The projection display apparatus of the present invention can further extend the focal length by moving the reflector, which has the focus adjusting function, by a larger distance than before. Accordingly, the projection display apparatus can be moved further away from a screen to project a larger image.

The above and other objects, features and advantages of the present invention will become apparent from the following description with reference to the accompanying drawings which illustrate examples of the present invention.

DESCRIPTION OF THE PREFERRED EMBODIMENTS

This application is based upon and claims the benefit of priority from Japanese Patent Application No. 2006-54839 filed on Mar. 1, 2006, the content of which is incorporated be reference.

Exemplary Embodiment 1

A projection display apparatus of this embodiment comprises a light source, an image forming element, and an illumination optical system for directing light emitted from the light source to the image forming element. The apparatus also comprises an imaging optical system for focusing an image (image light) formed by the image forming element on a screen. The apparatus further comprises a power supply unit for supplying power to each component, a cooling fan for cooling each component, and the like. The foregoing component members are contained in a housing. However, the projection display apparatus of the present invention is characterized by the configuration of the imaging optical system. Stated another way, the configuration of the present invention is the same as that of display apparatuses of the same type except for the imaging optical system. Accordingly, this specification will describe only the configuration of the imaging optical system in detail but omit a description of the remaining components.

Figure 1:
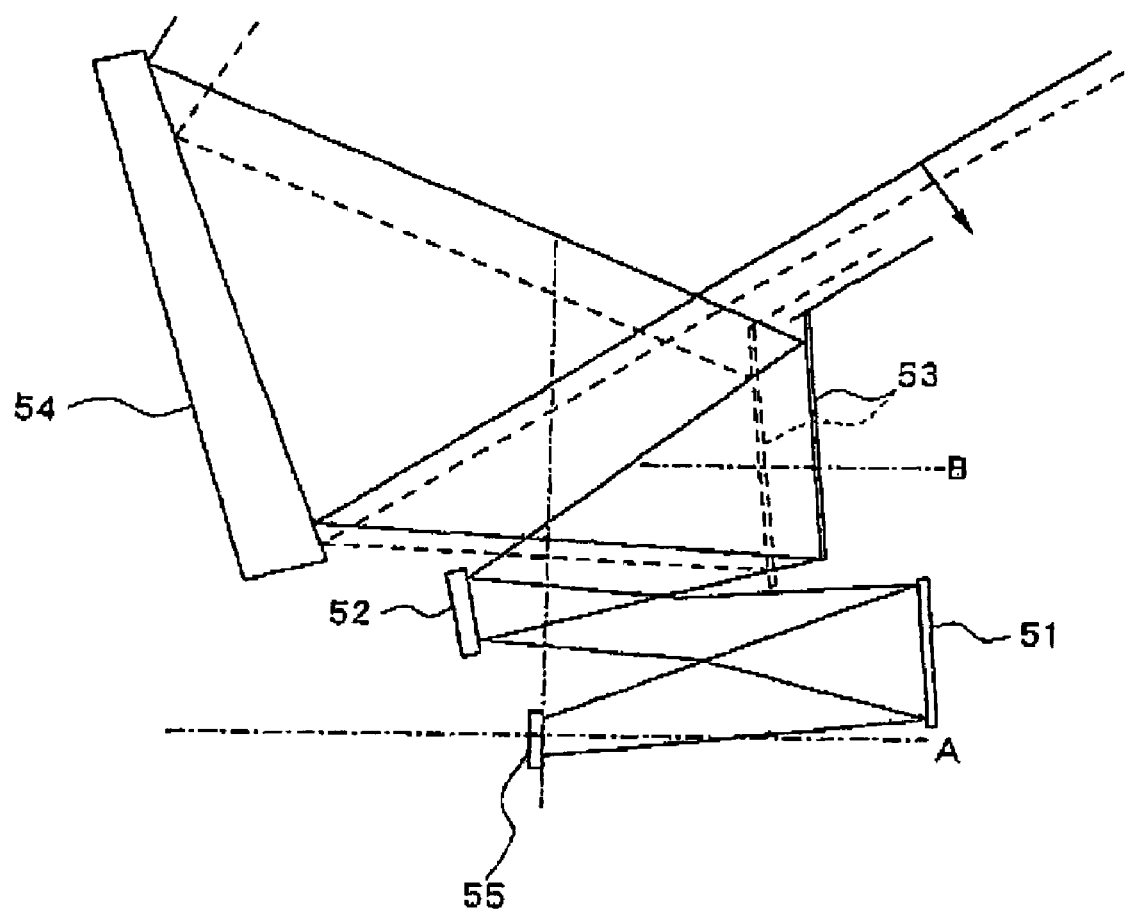
FIG. 1 is a schematic side view illustrating an exemplary imaging optical system.
Figure 2:
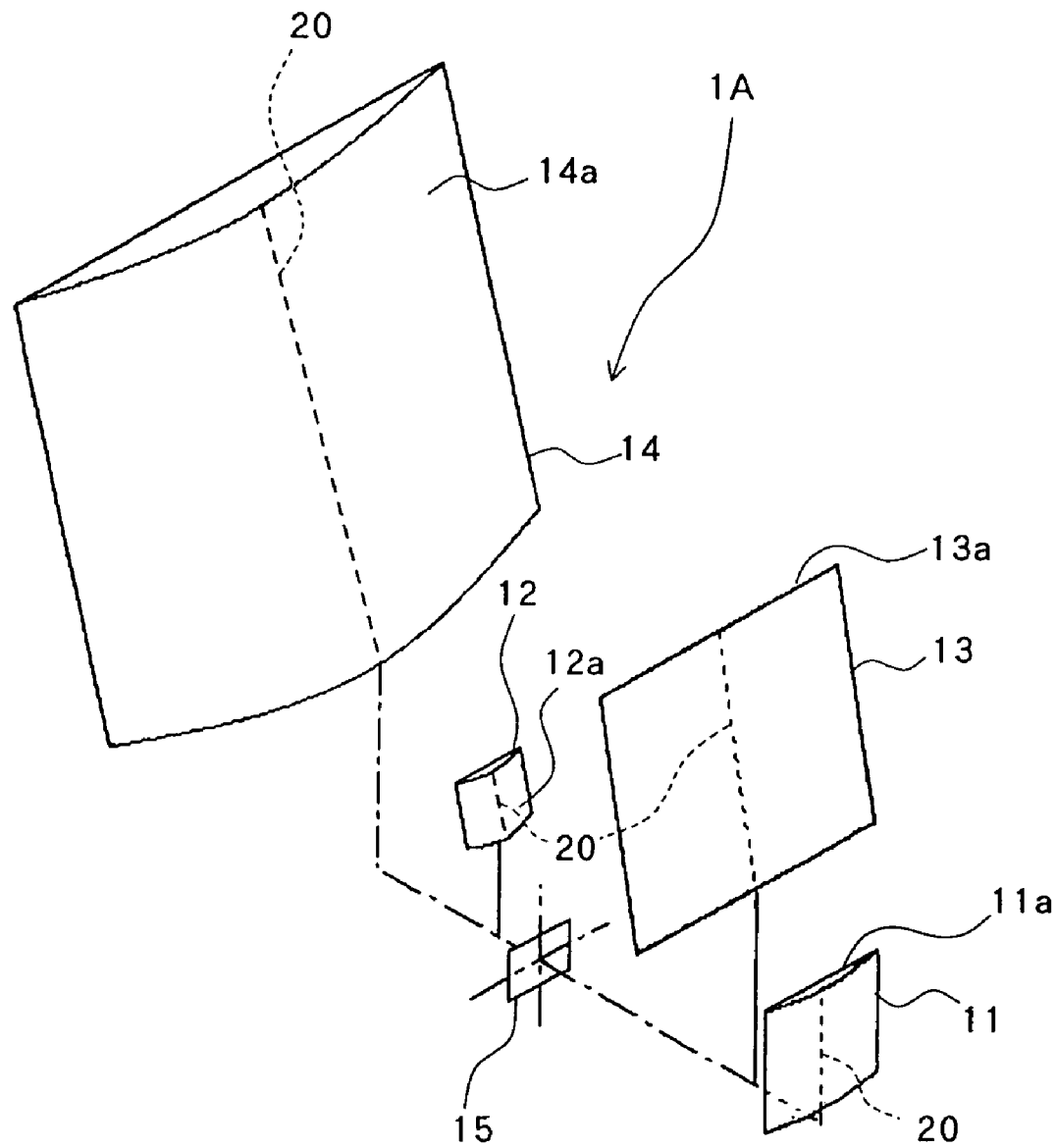
FIG. 2 is a schematic perspective view illustrating an exemplary imaging optical system contained in a projection display apparatus of the present invention.

FIG. 2 is a schematic perspective view illustrating the basic configuration of imaging optical system 1A which forms part of the projection display apparatus of this embodiment. Imaging optical system 1A is a reflection imaging optical system which is made up of four reflectors, i.e., first reflector 11 to fourth reflector 14. Each of first reflector 11 to fourth reflector 14 has a reflective surface which is a free-form surface. Chain line 20 drawn on each of illustrated reflectors 11-14 represents the axis of symmetry of reflectors 11-14. Each reflector has a shape that is symmetric about its axis of symmetry 20. Image light formed by image forming element 15 first impinges on reflective surface 11a of first reflector 11. The image light reflected by reflective surface 11a of first reflector 11 impinges on reflective surface 12a of second reflector 12. The image light incident on reflective surface 12a of second reflector 12 is reflected by reflective surface 12a, and impinges on reflective surface 13a of reflector. The image light reflected by reflective surface 13a of third reflector 13 impinges on reflective surface 14a of fourth reflector 14. The image light incident on reflective surface 14a of fourth reflector 14 is reflected (projected) by reflective surface 14a toward a screen, not shown.

Figure 3:
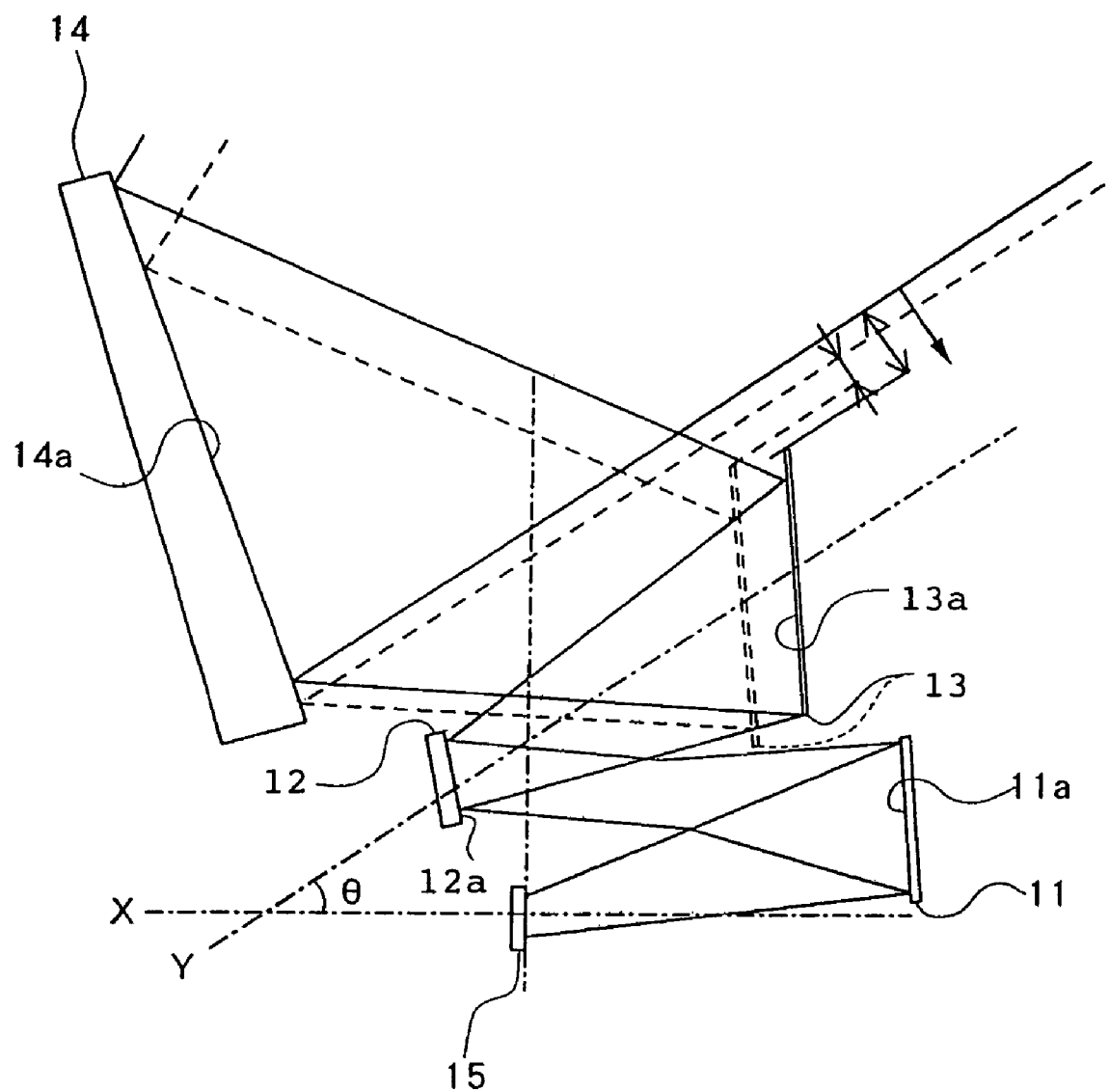
FIG. 3 is a schematic side view of the imaging optical system illustrated in FIG. 2.

Here, among reflective surfaces 11a-14a of first reflector 11 to fourth reflector 14, reflective surface 13a of third reflector 13 has the largest radius of curvature. Third reflector 13 functions as a reflector for adjusting focus. Specifically, as illustrated in FIG. 3, third reflector 13 is reciprocally movable along a line (hereinafter "reference axis Y") non-parallel with the normal line X of image forming element 15. Stated another way, third reflector 13 obliquely moves from the upper right to the lower left on the sheet of FIG. 3, or obliquely moves from the lower left to the upper right. In this embodiment, reference axis Y is inclined at inclination angle of 20° to the normal line X of image forming element 15. By thus moving third reflector 13 along reference axis Y non-parallel with the normal line X of image forming element 15, third reflector 13 can be brought closer to fourth reflector 14 than before while ensuring clearance between a light beam folded back by fourth reflector 14 and third reflector 13. This advantage of the present invention will be specifically described in comparison with a comparative example. When reference axis Y exists in a plane that includes the axis of symmetry 20 of each reflector 11-14, the symmetry is maintained at all times with respect to axis of symmetry 20 of reflector 13 even if third reflector 13 moves. As such, this is preferable because more attention need not be given to correcting aberration that results from movements of third reflector 13.

Figure 4:
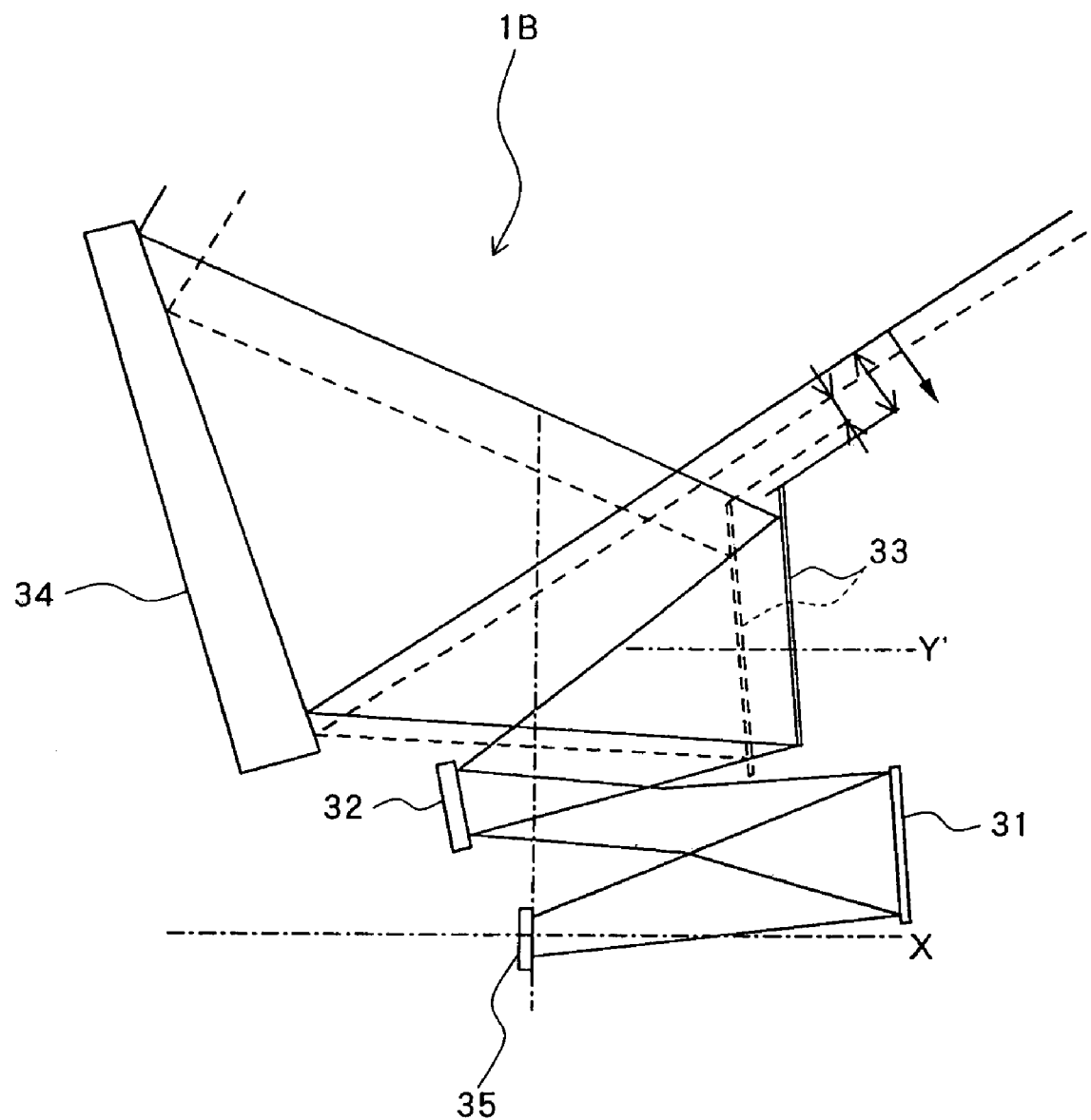
FIG. 4 is a schematic perspective view illustrating an imaging optical system of a comparative example.

FIG. 4 is a schematic side view illustrating imaging optical system 1B which is a comparative example. Focusing optical system 1B is a reflection imaging optical system which is made up of four reflectors, i.e., first reflector 31 to fourth reflector 34. Focusing optical system 1B focuses an image (image light) formed by image forming element 35 on a screen, not shown. Reflectors 31-34 are respectively common to reflectors 11-14 in shape, dimensions and the like, and also have their respective reflective surfaces in shapes common to reflectors 11-14. Focusing optical system 1B differs only in that third reflector 33 having a focus adjusting function moves along a line (hereinafter "reference axis Y'''") parallel with the normal line X of image forming element 35.

Figure 5:
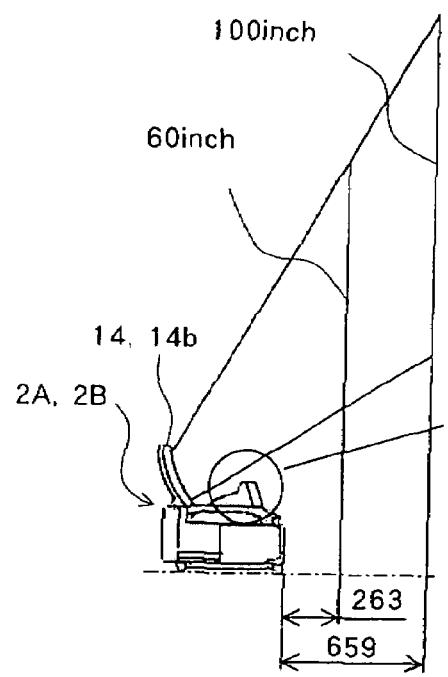
FIG. 5 is a side view showing a positional relationship between the projection display apparatus and screen.
Figure 6:
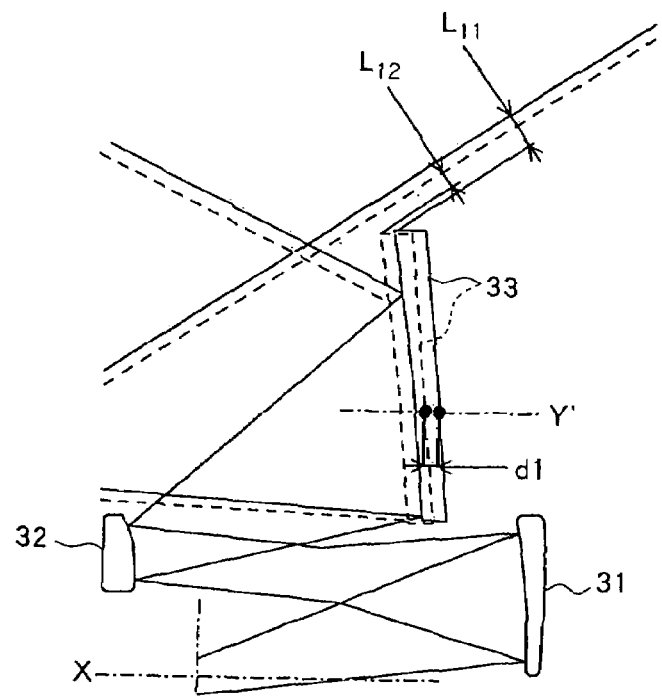
FIG. 6 is a partially omitted schematic side view showing the clearance between the third reflector and image light shown in FIG. 4.

As illustrated in FIG. 5, a screen is installed at a position 263 mm away from the front of projection display apparatus 2B which comprises imaging optical system 1B. Next, reflector 33 shown in FIG. 4 is adjusted in position to focus a projected image. Consequently, an image of 60 inches wide is projected onto the screen. When the focused 60-inch image is being displayed, clearance L11 of 8.7 mm is ensured between image light (light projected toward the screen) reflected by fourth reflector 34 (FIG. 4) and third reflector 33. Reference is made again to FIG. 5. When the screen is moved away to 659 mm from the front of projection display apparatus 2B while the 60-inch image is being displayed, the projected image is enlarged to be 100 inches wide, but the projected image is defocused. Accordingly, third reflector 33 is brought closer to fourth reflector 34 (FIG. 4) along reference axis Y' parallel with the normal line of image forming element 35, as illustrated in FIG. 6. Moving distance d1 of third reflector 33 is 3.8 mm at the time that the projected image is focused. Also, clearance L12 is 3.1 mm between the image light reflected by fourth reflector 34 and third reflector 33.

Figure 7:
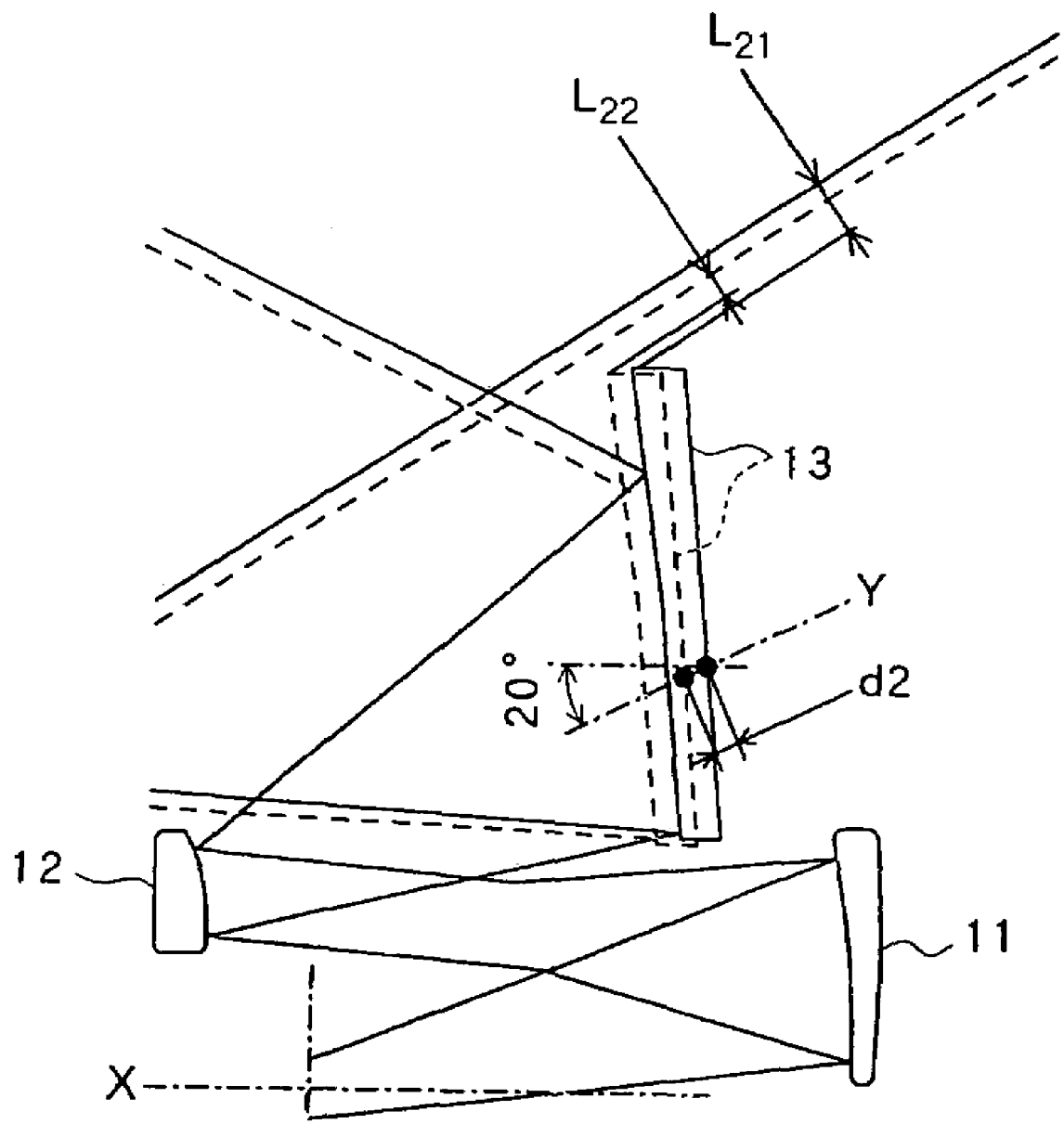
FIG. 7 is a partially omitted schematic side view showing the clearance between the third reflector and image light shown in FIG. 3.

On the other hand, a screen is installed at a position 263 mm away from the front of projection display apparatus 2A of this embodiment which comprises imaging optical system 1A, as illustrated in FIG. 5. Next, third reflector 13 (FIG. 3) is adjusted in position such that the projected image is focused. Consequently, a focused 60-inch image is projected onto the screen. As illustrated in FIG. 7, when the focused 60-inch image is being displayed, clearance L21 of 8.7 mm is ensured between the image light (light projected toward the screen) reflected by fourth reflector 14 (FIG. 3) and third reflector 13. Next, the screen is moved away to a distance of 659 mm from the front of projection display apparatus 2A. Consequently, the projected image is expanded to be 100 inches wide. Next, the projected image is focused by bringing third reflector 13 closer to fourth reflector along reference axis Y non-parallel with the normal line X of image forming element 15. Moving distance d2 of third reflector 13 is 3.8 mm at the time that the projected image is focused. Also, clearance L22 is 4.3 mm between the image light reflected by fourth reflector 14 and the third reflector 13.

As described above, imaging optical system 1A largely differs from imaging optical system 1B in the amount of clearance between third reflector 13, 33 and image light after the movement even if third reflector 13, 33 moves the same distance (d1=d2) with reference to the position at which the 60-inch image is projected. Specifically, imaging optical system 1A ensures that the clearance will be 39% larger than the clearance which imaging optical system 1B provides. In essence, in projection display apparatus 2A of this embodiment which comprises imaging optical system 1A, a sufficient clearance is ensured even if the focal length is extended by bringing third reflector 13 closer to fourth reflector 14, thus making it possible to project a larger image. The result of the foregoing comparison is summarized in Table 1.

TABLE 1

| Screen Size [inches] | | 100 | 60 |
|---|---|---|---|
| Amount [mm] that the Reflector is moved | | 3.8 | 0.0 |
| Clearance [mm] | Parallel Movement | 3.1 | 8.7 |
| | 20° Oblique Movement | 4.3 | 8.7 |
| | Effect [%] | 139% | 100% |

Exemplary Embodiment 2

A projection display apparatus of this embodiment has substantially the same configuration as the projection display apparatus of Exemplary Embodiment 1. Therefore, a description will be omitted for common components. The projection display apparatus of this embodiment differs from the projection display apparatus of Exemplary Embodiment 1 in the following two aspects. One difference lies in that the first reflector has a spherical reflective surface, and the other difference lies in that the reference axis, which defines the direction in which the third reflector moves, is inclined at 14.66° to the normal line of the image forming element.

Figure 8:
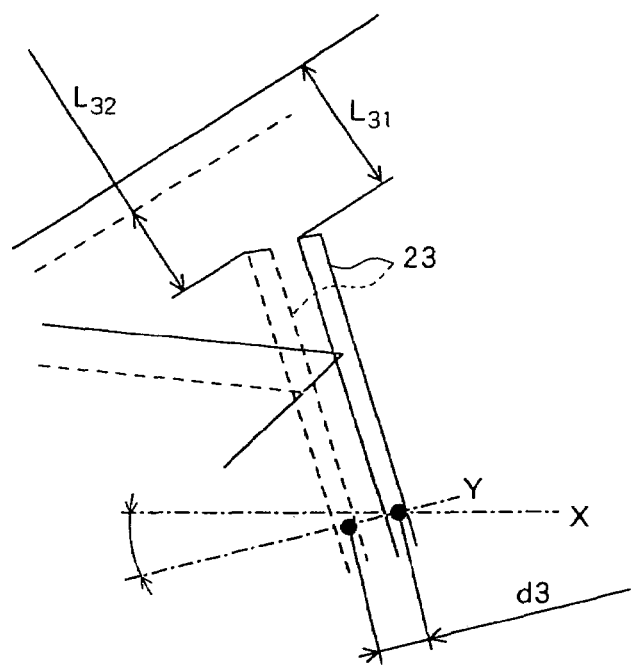
FIG. 8 is a partially omitted schematic side view illustrating another embodiment of an imaging optical system contained in a projection display apparatus of the present invention.

FIG. 8 illustrates third reflector 23 in an imaging optical system contained in the projection display apparatus of this embodiment. In the imaging optical system contained in the projection display apparatus of this embodiment, clearance L31 of 9.6 mm is ensured between third reflector 23 and image light reflected by a fourth reflector (not shown) when a focused 60-inch image is being projected onto a screen. Also, clearance L32 of 6.2 mm is ensured between third reflector 23 and the image light reflected by the fourth reflector when a focused 100-inch image is being projected onto the screen. Further, third reflector 23 must be moved by distance d3 that is equal to 3.33 mm in order to focus the 100-inch image, when based on the position of third reflector 23 at which the 60-inch image is projected.

Figure 9:
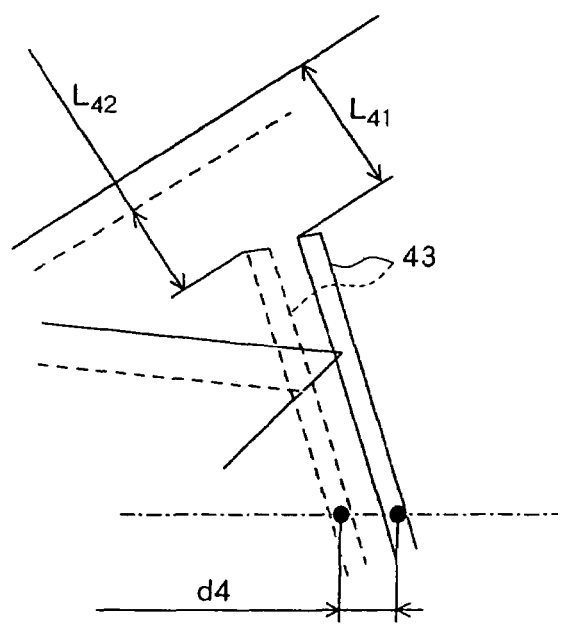
FIG. 9 is a partially omitted schematic side view showing the clearance between the third reflector and image light shown in FIG. 4.

FIG. 9 illustrates a comparative example of an imaging optical system which has the same configuration as the imaging optical system in this embodiment except that a third reflector having a focus adjusting function moves in a direction parallel with the normal line of an image forming element. In this imaging optical system, clearance L41 of 9.6 mm is ensured between third reflector 43 and image light reflected by a fourth reflector (not shown) when a focused 60-inch image is being projected onto a screen. Also, clearance L42 of 5.5 mm is ensured between third reflector 43 and image light reflected by the fourth reflector when a focused 100-inch image is being projected on the screen. Further, third reflector 43 must be moved by distance d4 that is equal to 3.33 mm in order to focus the 100-inch image, when based on the position of third reflector 43 at which the 60-inch image is projected.

As described above, in the imaging optical system contained in the projection display apparatus of this embodiment, the clearance between the third reflector and image light reflected by the fourth reflector is increased by 13% as compared with the comparative example illustrated in FIG. 9. The result of the comparison is summarized in Table 2.

TABLE 2

| Image Size [inches] | | 100 | 60 |
|---|---|---|---|
| Amount [mm] that the Reflector is moved | | 3.3 | 0.0 |
| Clearance [mm] | Parallel Movement | 5.5 | 9.6 |
| | 20° Oblique Movement | 6.2 | 9.6 |
| | Effect [%] | 113% | 100% |

As is apparent from the foregoing description, the present invention is characterized by an imaging optical system which comprises the reflector movable along the reference axis non-parallel with the normal line of the image forming element. As such, the present invention is not particularly limited in the number of reflectors which make up the imaging optical system, the material of each reflector, the shape of reflective surfaces, and the like. However, in an enlarging/imaging optical system, if distortions, deformations and the like exist on a reflector (first reflector) which first receives image light formed by an image forming element, their influence will steadily increase. Thus, a higher accuracy is required for the reflective surface of the first reflector than for the reflective surfaces of the remaining reflectors. Further, the first reflector is largely affected by heat because it is closest to the image forming element. For this reason, the first reflector is preferably formed of a material having a low coefficient of linear expansion. In addition, the foregoing viewpoints, the first reflector is preferably designed to have a spherical reflective surface. A spherical reflective surface would permit the use of a glass material having a low coefficient of linear expansion, and could be formed with high accuracy by a polishing method which requires low manufacturing cost.

On the other hand, an imaging optical system is required not only to simply project images of large sizes but also to project distortion-free images. However, if the first reflector is designed to have a spherical reflective surface, it cannot be expected to provide a large distortion correction effect. In addition, to minimize a change in the light path associated with focus adjustment, a reflector having a focus adjusting function is preferably designed to have a reflective surface in a shape that is as flat as possible. Therefore, majority of the task for distortion correction is preferably distributed to reflectors other than the first reflector and the reflector having a focus adjusting function.

In talking the foregoing situation full consideration, it is preferable to design the first reflector so that it has a spherical reflective surface and to design the remaining reflectors, each of which has an aspherical or free-form reflective surface, so that they provide a high distortion correction effect. Further, the reflector having the focus adjusting function is preferably designed to have the largest radius of curvature of all the reflectors.

The image forming element may be a liquid crystal panel or DMD (Digital Micro-mirror Device). When the image forming element is implemented by DMD, the normal line refers to the normal line of a plane which approximates the surface of each micro-mirror. Further, when a cover glass is placed over the front of each micro-mirror, the normal line of the cover glass surface can be regarded as the same as the normal line of the plane which approximates the surface of each micro-mirror at least in the present invention.

While preferred embodiments of the present invention have been described using specific terms, such description is for illustrative purposes only, and it is to be understood that changes and variations may be made without departing from the spirit or scope of the following claims.

What is claimed is:

1. A projection display apparatus comprising:
   an image forming element; and
   an imaging optical system comprising a plurality of reflectors for projecting an image formed by said image forming element to provide an enlarged version of the image,
   wherein at least one of the reflectors in said imaging optical system is movable such that the focus can be adjusted,
   wherein said movable reflector is movable along a straight line that is non-parallel with a normal line of said image forming element,
   wherein said plurality of reflectors comprises a first reflector on which light emitted from said image forming element first impinges, a second reflector on which light reflected by said first reflector impinges, a third reflector on which light reflected by said second reflector impinges, and a fourth reflector on which light reflected by said third reflector impinges,
   wherein said third reflector comprises said movable reflector which is movable for adjusting the focus, and
   wherein said first reflector comprises a spherical reflective surface, and each of said second reflector, said third reflector, and said fourth reflector comprises an aspherical or a free-form reflective surface.

2. The projection display apparatus according to claim 1, wherein an image light reflected by said movable reflector impinges on a next reflector in said plurality of reflectors, and
   wherein said movable reflector is movable such that a clearance is provided between said movable reflector and said image light reflected by said next reflector.

3. The projection display apparatus according to claim 1, wherein said movable reflector is movable along a reference axis which is non-parallel with said normal line of said image forming element, and
   wherein said reference axis exists in a plane that includes an axis of symmetry of said plurality of reflectors.

4. The projection display apparatus according to claim 1, wherein an image light from said image forming element is reflected by the first reflector and impinges on the second reflector which reflects said image light,
   wherein an image light reflected by the second reflector impinges on the third reflector which reflects said image light,
   wherein an image light reflected by the third reflector impinges on the fourth reflector which reflects said image light in a direction toward a screen of said projection display apparatus.

5. The projection display apparatus according to claim 1, further comprising:
   a light source; and
   an illumination optical system for directing light emitted from the light source to the image forming element.

6. The projection display apparatus according to claim 1, wherein said image forming element comprises a liquid crystal panel.

7. The projection display apparatus according to claim 1, wherein said image forming element comprises a Digital Micro-mirror Device (DMD), said normal line comprising a normal line of a plane which approximates a surface of a micro-mirror in said DMD.

8. The projection display apparatus according to claim 1, wherein said first reflector comprises a glass material having a low coefficient of linear expansion and a spherical reflective surface.

9. The projection display apparatus according to claim 8, wherein said first reflector comprises a polished reflector.

10. A projection display apparatus comprising:
    an image forming element; and
    an imaging optical system comprising a plurality of reflectors for projecting an image formed by said image forming element to provide an enlarged version of the image,
    wherein at least one of the reflectors in said imaging optical system is movable such that the focus can be adjusted,
    wherein said movable reflector is movable along a straight line that is non-parallel with a normal line of said image forming element,
    wherein said movable reflector comprises a reflective surface having a radius of curvature which is the largest of the radii of curvature of the reflective surfaces of the reflectors which make up said imaging optical system,
    wherein said plurality of reflectors comprises a first reflector on which light emitted from said image forming element first impinges, a second reflector on which light reflected by said first reflector impinges, a third reflector on which light reflected by said second reflector impinges, and a fourth reflector on which light reflected by said third reflector impinges, and
    wherein said third reflector comprises said movable reflector which is movable for adjusting the focus.

11. The projection display apparatus according to claim 10, wherein said first reflector comprises a spherical reflective surface, and each of said second reflector, said third reflector, and said fourth reflector comprises an aspherical or a free-form reflective surface.

12. An imaging optical system for a projection display apparatus, said system comprising:
    a plurality of reflectors for projecting an image formed by an image forming element of said projection display apparatus to provide an enlarged version of the image,
    wherein at least one of the reflectors comprises a movable reflector which is movable along a straight line that is other than parallel with a normal line of said image forming element,
    wherein said plurality of reflectors comprises a first reflector on which light emitted from said image forming element first impinges, a second reflector on which light reflected by said first reflector impinges, a third reflector on which light reflected by said second reflector impinges, and a fourth reflector on which light reflected by said third reflector impinges,
    wherein said third reflector comprises said movable reflector which is movable for adjusting the focus, and
    wherein said first reflector comprises a spherical reflective surface, and each of said second reflector, said third reflector, and said fourth reflector comprises an aspherical or a free-form reflective surface.

* * * * *